UNITED STATES PATENT OFFICE.

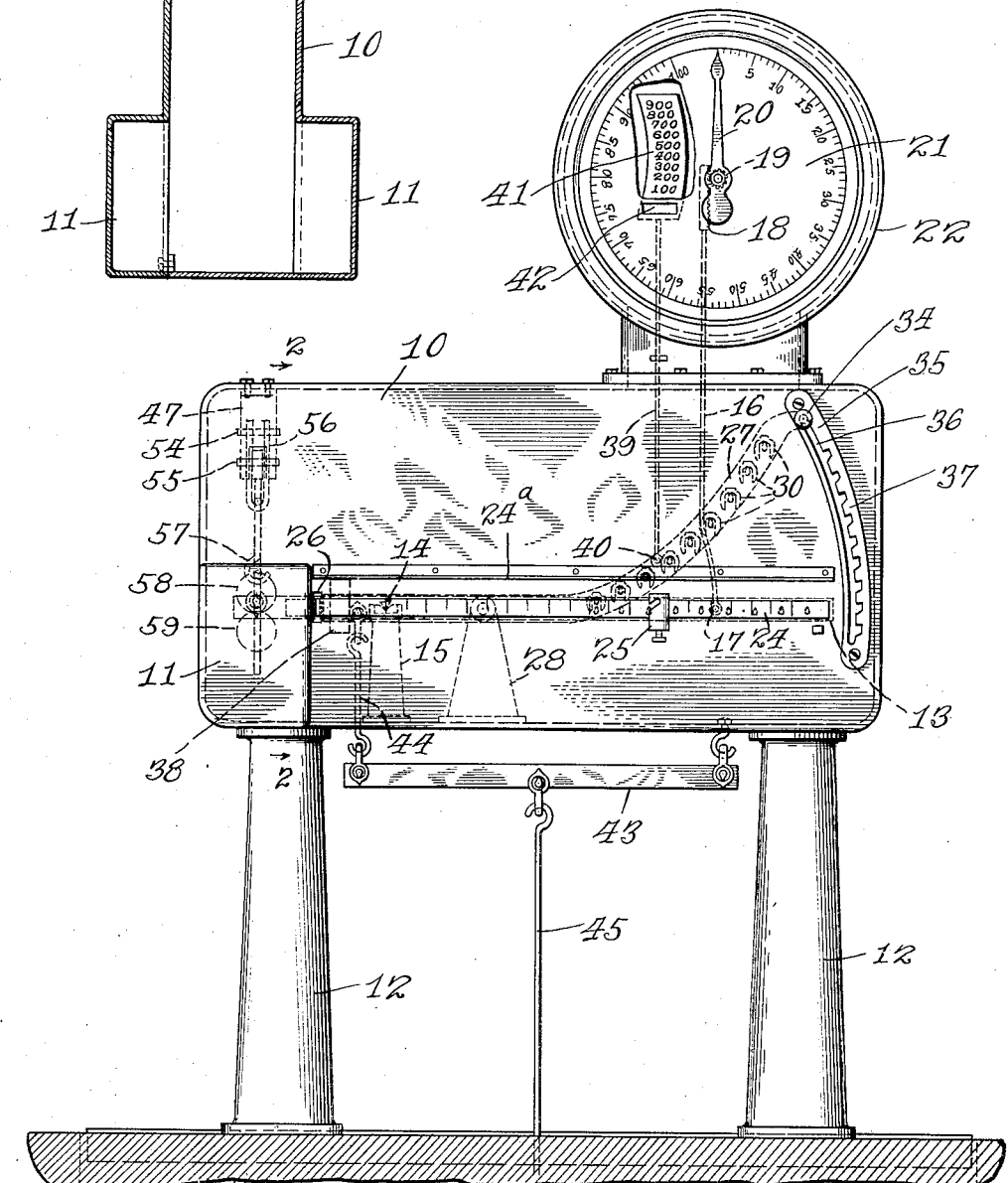

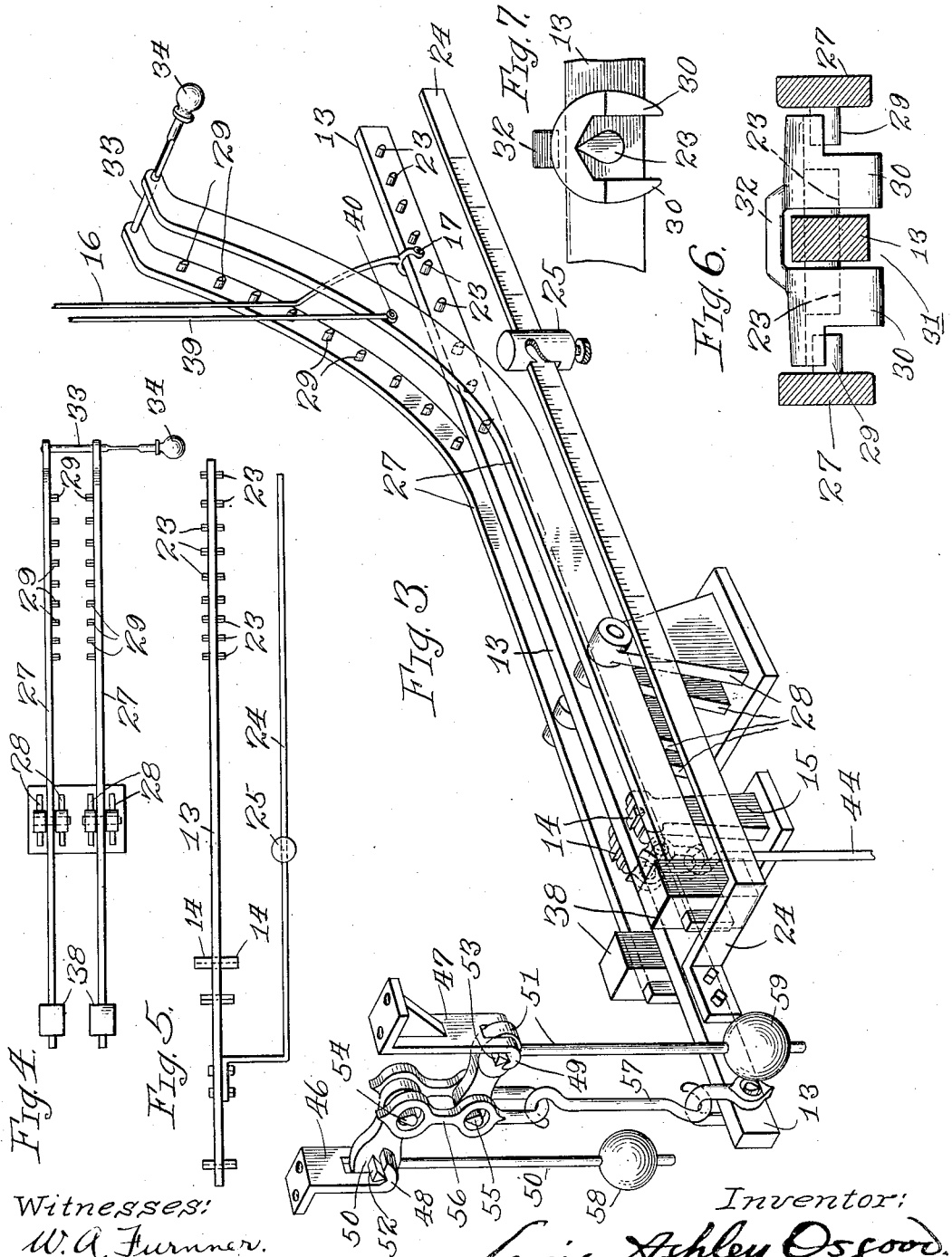

LOUIS ASHLEY OSGOOD, OF SPRINGFIELD, OHIO, ASSIGNOR, BY DIRECT AND MESNE ASSIGNMENTS, TO AMERICAN AUTOMATIC SCALE COMPANY, OF CHICAGO, ILLINOIS, A CORPORATION OF ILLINOIS.

WEIGHING APPARATUS.

1,198,757.  Specification of Letters Patent.  Patented Sept. 19, 1916.

Application filed December 5, 1913. Serial No. 804,800.

*To all whom it may concern:*

Be it known that I, LOUIS ASHLEY OSGOOD, a citizen of the United States, residing at Springfield, in the county of Clark and State of Ohio, have invented certain new and useful Improvements in Weighing Apparatus, of which the following is a specification, reference being had to the accompanying drawings.

This invention relates to improvements in weighing apparatus and particularly to platform scales adapted for use in ascertaining the correct weight of comparatively heavy loads, and in which due and correct allowance is to be made for tare or the weight of trucks, receptacles and similar holders or containers.

The leading objects of the invention are to provide improved means whereby a weigh-master or other scale attendant may, by the movement in one direction of a member located in juxtaposition to the weigh-beam, cause to be deposited on such beam a weight loosely carried by said member, or, if required, deposit a number of such weights successively at different places on the beam whereby such beam will be properly balanced to accord with the load on the load platform—the weight of the load being shown by suitable indicating means as more particularly described hereinafter; to provide improved means for locking said movable weight-carrying member in place after a weight, or a number of weights, shall have been so transferred to the beam; to provide a construction that will cause the weights so placed upon the beam to be transferred from the weigh-beam to said movable member after the said member has been unlocked and while it is moving back to normal or inoperative position, such transference being in the reverse order in which they were placed on the weigh-beam; to provide a new and improved counterbalancing means for the scale-beam; and to improve generally the construction and operation of machines of this general class. These various objects are accomplished by the devices and combinations of devices illustrated in the drawings and hereinafter specifically described.

Those things which I believe to be new will be set forth in the claims.

In the drawings:— Figure 1 is a front elevation of an apparatus embodying my improvements, a portion of the dial shown being broken away to expose the sliding numbered plate that is connected with the movable weight-carrying member; Fig. 2 is a vertical section at line 2—2 of Fig. 1 through the main case that houses the operative mechanism; Fig. 3 is a perspective view illustrating the construction and arrangement of the weigh-beam, the movable member that carries the series of weights that are adapted to be successively transferred during a weighing operation to the weigh-beam, and showing also the counterbalancing means attached to the rear or shorter end of the weigh-beam; Fig. 4 is a plan view of the weight-carrying movable member; Fig. 5 is a plan view of the weigh-beam and attached tare-beam; Fig. 6 is a detail, being an enlarged cross-sectional view through the weight-carrying movable member and the weigh-beam, and showing the position of the parts just after a weight has been transferred to the weigh-beam; and Fig. 7 is an end view of one of the transferable weights.

Referring to the several figures of the drawings in which corresponding parts are indicated by like reference characters, 10 indicates a casing in which are inclosed the weigh-beam, the movable weight-carrying member and the pendulum mechanism that constitutes the counterbalance at the shorter end of the weigh-beam. As best shown in Fig. 2, the casing has at one end lateral extensions to allow for the proper lateral swing of the pendulum members. These lateral extensions are indicated by 11.

12 are pillars for supporting the casing.

13 indicates the weigh-beam pivotally supported on knife-edges 14—14 resting in suitable bearings on the upper ends of standards 15 that are secured to the base of the casing 10.

16 indicates a rod pivotally attached at its lower end at 17 to the beam 13 and having at its upper end a rack 18 that is suitably held in engagement with a pinion 19, on the shaft of which is secured a pointer 20 that is adapted to be rotated over the face of a properly graduated dial 21—the dial frame being indicated by 22. To the rear or shorter end of the weigh-beam is connected the counterbalancing pendulum mechanism hereinafter described.

23 indicates a plurality of studs formed with upwardly projecting knife-edges. These knife-edge studs project horizontally from each side face of the weigh-beam 13 as shown in Figs. 5 and 6, the studs of the two sides being in alinement.

24 indicates a tare-beam, suitably marked on its outer face with weight indications, as usual, and on which is mounted a movable poise 25. This tare-beam is securely attached to the front face of the weigh-beam 13 near the rear end thereof. Near such point of attachment the tare-beam is bent at right angles to allow it to extend through a suitable opening 26 in the front wall of the casing 10 (see Fig. 1) and is again bent to lie close to the outer face of the front wall of the casing and parallel with the weigh-beam inside of the casing.

24ª indicates a bracket or shelf secured to the front face of the casing 10, said bracket or shelf extending over the tare-beam and serving to protect it and its poise from injury or displacement.

27—27 indicate two parallel bars that form a frame that constitutes the movable weight-carrying member hereinbefore referred to. These bars are each suitably pivotally mounted between the upper ends of a pair of standards 28—28 that are secured to the base of the casing 10. Such standards in the construction shown are located a short distance in advance of the standards 15 upon which the weigh-beam is pivoted. The weigh-beam extends between the two pairs of supporting standards 28, and the two bars 27, 27 are, throughout their length, maintained at the same distance from the weigh-beam. The inner face of each bar 27 is provided with a series of laterally-extending knife-edge studs 29, the studs corresponding in number to the studs 23 on the weigh-beam. The outer or forward end portions of the bars 27 are curved upward as shown, and the various studs 29 are so located and arranged on these curved portions that as the bars 27—27 are moved down such studs will come into exact alinement with the studs 23 that project from the side faces of the weigh-beam, but, as clearly shown in Fig. 6, there will be a sufficient space between the ends of the studs on the weigh-beam and the ends of the studs on the separated bars 27 to insure against interference by contact of the studs.

30 indicates weights, one of such weights being adapted to normally be suspended on each pair of alined studs 29 on the movable member that is composed of the two bars 27—27. These weights may also during a weighing operation be transferred to and imposed upon the weigh-beam, and in such latter situation each weight will rest upon a pair of the knife-edge studs 23 that project in alinement from opposite sides of the said weigh-beam. To allow for the proper seating of the weights on either a pair of alined studs of the separated bars 27 or a pair of alined studs on the weigh-beam each weight is made, as best shown in Figs. 6 and 7, with a deep central bifurcation adapted to receive the weigh-beam, the two halves or parts into which the weight is divided by this bifurcation being connected by a bridge-piece 32 preferably formed integral with said halves or parts. Each of these weight parts is suitably recessed, as shown, to properly receive either the knife-edge studs 23 or 29 so that the weight in either case will hang properly and evenly thereon.

33 indicates a rod connecting the upper and forward ends of the two bars 27—27 together, such rod being made long enough to extend through the front of the casing 10, and at such end it may be provided with an operating knob or handle portion as 34. The casing is provided with a curved slot to permit movement of the rod 33 when the bars 27—27 are turned on their pivots. The front of the casing is provided with a plate 35 having a slot 36 registering with the casing slot mentioned and provided also with a series of notches constituting a curved rack 37. The rod is adapted to engage in any one of these several notches and thereby lock the pivoted bars 27 in any adjusted position.

38 indicates heavy blocks suitably affixed to the inner or shorter ends of the bars 27, such blocks acting to slightly overbalance the forward weighted end of the movable member, or bars 27, and aiding in the ready return of such member to normal or inactive position.

39 indicates a rod pivotally connected at 40 at its lower end to one of the bars 27 of the said movable member and having its upper end projected through the lower part of the dial frame 22 and attached to a sliding numbered plate 41 located within the said dial frame.

42 indicates a sight-opening in the dial through which a number on the said plate may be exposed to view when the plate is moved with the movable member 27—27 as hereinafter set forth.

43 indicates a bar or lever suitably pivotally suspended near one end from the case 10 and near its other end connected through a link 44 with the weigh-beam just back of the knife-edge pivots 14 of such beam.

45 indicates a link connected to substantially the central portion of the bar or lever 43 and depending therefrom, said link 45 being connected at its lower end to any ordinary system of levers that support a load-platform. Such load-receiving platform and its system of levers are not herein shown as they constitute no part of my present invention.

Turning now to the means employed for obtaining the required resistance to the platform load as indicated by the pointer 20 in connection with the dial 21—46 and 47 indicate two similar depending brackets secured to the upper wall of the casing 10 near the rear end thereof and each provided with an inturned lip 48 and 49, respectively. The lower part of the vertical wall and also the lip portion of each bracket are slotted to permit the projection therethrough of a bell-crank lever, one such lever being provided for each bracket, the one for the bracket 46 being indicated by 50 and the other one by 51. These bell-crank levers are suspended by suitable knife-edges 52 and 53, respectively, that bear upon the bracket lips 48 and 49. The free end of the short arm of the bell-crank 51 lies beneath and at some little distance from the corresponding end of the other bell-crank and from each extends knife-edge studs,—54 indicating one of the studs on the bell-crank 50 and 55 one of the studs on the other bell-crank.

56 indicates a yoke, in each of the side bars of which are formed two openings that constitute bearings into which project the knife-edge studs 54 and 55, whereby said yoke 56 is hung upon said studs. To the lower closed end of this yoke 56 is suspended a short link 57 that at its lower end is hooked, or otherwise suitably connected, to the weigh-beam, that is in the same vertical plane with the studs 54 and 55, near the rear end of said beam.

58, 59 indicate weights attached respectively near the lower ends of the long arms of the bell-cranks 50 and 51.

With the parts assembled as indicated in Fig. 1, an dit being desired to first ascertain the weight of a truck, box or other receptacle or article that is to be used to bring merchandise to the scale, such truck or other article will be placed on the load platform and through the various links and levers that are interposed between the platform and the weigh-beam such beam will be turned on its knife-edge pivots and as its longer end rises will, through the rod 16, rack 18 and pinion 19, force the pointer to correctly indicate on the dial 21 the weight of such article. Thereupon the poise 25 will be pushed by the attendant along the tare-beam 24 sufficiently far to overcome the tilting of the weigh-beam that is connected to the tare-beam and thus the pointer will again be brought to zero on the dial. Thereafter any merchandise or material placed on or in such truck or other container will have its true weight indicated so long as the position of the poise on the tare-beam is not disturbed. If such merchandise to be thus weighed is one-hundred pounds, or less than one-hundred pounds, (which is the limit of weight indications on the dial in the construction illustrated) the upward push on the rod 16 imparted by the moving weigh-beam will, through the rack and pinion, move the pointer to the correct indication on the dial. If, however, the weight is in excess of one-hundred pounds the pointer will pass into the blank space on the dial and there be stopped by reason of the weigh-beam or tare-beam coming in contact with a suitable stop. The bracket 24$^a$ may if desired constitute such a stop. Such stoppage will be a signal to the attendant that the weight of the article being weighed is in excess of one hundred pounds and he will thereupon move down the member comprising the parallel bars 27, 27. Upon such member being so moved down sufficiently far to bring the handle rod 33 where it can engage the first one of the notches in the rack 37 the lowermost one of the weights 30 that is suspended between the bars 27, 27 will have been carried down so that it is engaged by the first or innermost pair of studs 23 and be left wholly suspended thereon, due to the fact that the studs that had just borne the weight have been moved down past the said first pair of studs 23. This described downward pull on the weight-carrying movable member will, through the rod 39, pull down the plate 41 sufficiently far to expose to view through the sight-opening 42 the number 100. Now if the net weight of the article being weighed should be, for example, 165 pounds, the weigh-beam, having had added to it a weight 30 that is the equivalent of a counterpoise for one-hundred pounds on the load-platform, will turn so that its long arm descends sufficiently to turn the pointer counter-clockwise until it comes to rest opposite the figure 65 on the dial, and thereby the plate figure 100 exposed through the sight opening 42 taken in connection with the dial figure 65 opposite which the pointer has stopped will show the correct net weight. If, however, after moving the rod 33 down to and in engagement with the said first notch of the rack 37 the attendant observes that the pointer 20 still remains in the blank space on the dial it is an indication that the weight to be ascertained exceeds the combined indications afforded by the dial and the figure 100 on the plate 41 and he will thereupon pull down on the handle 34 until the rod 33 is opposite the second notch of the rack. Such action causes, of course, a further turning of the pivoted bars 27 and causes the next or second weight 30 to also become detached from its knife-edge studs 29 and be suspended upon the next or second set of knife-edge studs 23 on the weigh-beam, as described in connection with the first weight. The addition of this second weight 30 to the weigh-beam is therefore equivalent to providing the beam with a counterpoise for two hundred pounds on the load-platform, and if the article on the load-platform should weigh between 200 and 300 pounds, two hundred pounds of such weight would be indicated by the figure 200 on the plate 41, as such plate would have been drawn down to expose that figure through the sight-opening 42, and the balance of the weight would be indicated on the dial by the pointer as before described.

From the foregoing description it will be plain that the attendant has but to continue forcing down the movable member formed of the parallel bars 27, 27 to cause a sufficient number of the weights 30 to be successively detached from such member and added as counterpoises to the weigh-beam to quickly and accurately ascertain the weight of the article in the truck or other container on the load-platform,—the pounds by hundreds showing through the sight-opening 42 and the additional pounds of less number than a hundred being indicated by the position of the pointer over the dial. The return of the weight-carrying member 27—27 to its raised or normal position is assisted, or compelled, after the manual release of the bar 33 from the holding rack 37, by the weights 38 on the other end of said member, and on said return movement the weights 30 that have been deposited on the studs 23 of the weigh-beam, as described, will be lifted off such studs by the engagement therewith of the studs 29 on the inner faces of the bars 27, as will be understood—such transference of the weights to said last-named studs being, of course, in the reverse order to that in which they were added to the weigh-beam.

While I have shown and described the dial 21 as being designed to indicate single pounds up to one hundred and the sliding plate 41 as being intended to indicate pounds in hundreds it is of course not intended to limit the scope of the invention to indications of that character, as it is evident that the numerals on the plate may be made to indicate in thousands or larger figures, if desired, and the dial figures indicate any desired fractional parts of the plate numbers. It is also true that other weight indicating means than the plate and dial may be employed in connection with the weight-carrying and transferring mechanism shown and described.

The construction and arrangement of the counterbalancing mechanism employed at the rear or shorter end of the weigh-beam will be found to possess decided advantages over existing constructions. The construction embodies in effect the use of two pendulums each consisting of the long arm of a bell-crank lever and the weight attached thereto, and by reason of the swing of these pendulums being in a direction at right-angles to the length of the weigh-beam and away from the beam I am enabled to make them of considerable length without any danger of their interfering with the beam. Again, it is recognized that weighing apparatus should always be supported on a level surface in order to obtain accuracy in the weighing, but if for any reason such support becomes out of level the arrangement of the pendulum counterbalancing means shown will to a very considerable extent compensate for such conditions and in many instances will render unnecessary special compensating devices that have to be provided where the swing or movement of the counterbalancing weight or weights is in the direction of the length of the weigh-beam. Furthermore, connecting these counterbalancing pendulum weights back of the load pivot as shown will give a material reduction in the pull required to operate them and consequently lighter weights can be employed, and that is advantageous as, of course, the lighter the weights the less wear there will be on the fulcrum pivot or pivots.

What I claim as my invention and desire to secure by Letters Patent is,—

1. In a scale, the combination with a pivoted weigh-beam, of a movable member, one of said parts comprising two pivoted bars, one at each side of and at a distance from the said other part, a stud on the inner face of each of said bars adapted to loosely support a weight, and means on the other part adapted to receive such weight when one of the parts is moved past the other part.

2. In a scale, the combination with a pivoted weigh-beam, of a movable member comprising two pivoted bars, one at each side of and at a distance from said weigh-beam, a stud on the inner face of each of said bars adapted to loosely support a weight, and means on the weigh-beam adapted to receive such weight as said movable member is turned in one direction.

3. In a scale, the combination with a pivoted weigh-beam, of a movable member comprising two pivoted bars, one at each side of and at a distance from said weigh-beam, a stud on the inner face of each of said bars adapted to loosely support a weight, and studs projecting from both faces of the weigh-beam for receiving such weight as the movable member is turned in one direction.

4. In a scale, the combination with a pivoted weigh-beam, of a movable member comprising two pivoted bars, one at each side of and at a distance from said beam and each bar having a turned portion, means on the said turned portions of the bars for removably sustaining a plurality of weights, and means on the weigh-beam for receiving such weights when said bars are moved in one direction.

5. In a scale, the combination with a pivoted weigh-beam, of a movable member having a turned portion, said member being located in proximity to said beam, means on the said turned portion of said member for removably sustaining a plurality of weights, and means on the weigh-beam for receiving such weights when said movable member is moved in one direction to carry its weight-sustaining portion past the weigh-beam.

6. In a scale, the combination with a pivoted weigh-beam, of a movable member comprising two pivoted bars, one at each side of and at a distance from the weigh-beam, a weight bifurcated to adapt it to straddle said weigh-beam, means on said bars for loosely suspending said weight between the bars and over the beam, and means on the beam for receiving and supporting such weight when said movable member is turned in one direction.

7. In a scale, the combination with a pivoted weigh-beam, of a movable member comprising two pivoted bars, one at each side of and at a distance from the weigh-beam, a weight bifurcated to adapt it to straddle said weigh-beam and having recesses at each side of the bifurcation and in each of its outer faces, a stud projecting from the inner face of each of said bars for entering the recessed outer faces of said weight to hold said weight movably suspended, and studs projecting from each face of the beam for entering the said recesses at the sides of the bifurcation of the weight to engage said weight and cause it transference to the beam when said movable member is moved in one direction.

8. In a scale, the combination with a pivoted weigh-beam, of a counterbalancing mechanism comprising two pivoted bell-crank levers, one arm of each of which is weighted and arranged to swing at right angles to the plane of movement of the weigh-beam and the other arms of said levers being arranged one above the other and above the weigh-beam, means for pivotally connecting said last-named arms together, and means for also connecting them to the weigh-beam.

9. In a scale, the combination with a pivoted beam, of a counterbalancing mechanism comprising two pivoted bell-crank levers, one arm of each being weighted, means for pivotally connecting the other arms thereof together, and means for connecting said last-named arms to said beam.

10. In a scale, the combination with a pivoted beam, of a counterbalancing mechanism comprising two pivoted bell-crank levers, one arm of each being weighted and the ends of the other arms arranged one over the other, means for pivotally securing said other arms together, and means for also connecting them to said beam.

11. In a scale, the combination with a pivoted weigh-beam having a long and short end, of a counterbalancing mechanism comprising two pivoted bell-crank levers, the long arm of each being weighted and arranged to swing at right-angles to the plane of movement of the weigh-beam, and the ends of the short arms of the two bell-cranks lying in the same vertical plane as the weigh-beam, and means for pivotally connecting said short-arms together and to the weigh-beam.

12. In a scale, the combination with a pivoted weigh-beam, of a pivoted member having a turned end portion, said member being located in proximity to said beam, means on the said turned end portion for removably sustaining a plurality of weights, a counter weight on the opposite end portion of the said pivoted member, and means on the weigh-beam for receiving said weights when said member is moved in one direction.

13. In a scale, in combination, a pivoted weigh beam, a weight-carrying member disposed adjacent the weigh beam and movable in a plane parallel with the plane of movement of the weigh-beam, means on said member for receiving a plurality of weights, means on said weigh beam for successively receiving said weights when the weight-carrying portion of said member is moved in one direction past the beam, and a counterbalancing means for the weigh beam, said means comprising a pair of oppositely disposed oppositely acting pendulums mounted independently of the weigh beam and having suitable operating connections thereto, whereby said pendulums move in unison with the weigh beam and control its range of movement.

LOUIS ASHLEY OSGOOD.

Witnesses:
 ALBERT H. ADAMS,
 WILLIAM A. FURNNER.